(12) United States Patent
Sundararajan et al.

(10) Patent No.: US 9,236,592 B2
(45) Date of Patent: Jan. 12, 2016

(54) PROTECTIVE VEHICLE BATTERY CAGE AND METHOD OF MAKING A BATTERY CAGE

(71) Applicant: Ford Global Technologies, LLC, Dearborn, MI (US)

(72) Inventors: Srinivasan Sundararajan, Ann Arbor, MI (US); Fubang Wu, Troy, MI (US); Mohammed Omar Faruque, Ann Arbor, MI (US); Michael M. Azzouz, Livonia, MI (US); Sino Johan Van Dyk, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 13/686,298

(22) Filed: Nov. 27, 2012

(65) Prior Publication Data

US 2014/0147717 A1    May 29, 2014

(51) Int. Cl.
| | |
|---|---|
| *B60R 16/04* | (2006.01) |
| *H01M 2/00* | (2006.01) |
| *H01M 2/10* | (2006.01) |
| *B62D 21/02* | (2006.01) |
| *B62D 21/06* | (2006.01) |
| *B62D 23/00* | (2006.01) |

(52) U.S. Cl.
CPC ............ *H01M 2/1077* (2013.01); *B60R 16/04* (2013.01); *B62D 21/02* (2013.01); *B62D 21/06* (2013.01); *B62D 23/005* (2013.01); *H01M 2/1083* (2013.01); *H01M 2200/00* (2013.01); *Y10T 29/49826* (2015.01); *Y10T 29/49947* (2015.01)

(58) Field of Classification Search
None
See application file for complete search history.

(56) References Cited

U.S. PATENT DOCUMENTS

| | | | |
|---|---|---|---|
| 5,378,555 A | 1/1995 | Waters et al. | |
| 6,228,528 B1 * | 5/2001 | Burkholder et al. | 429/163 |
| 8,051,934 B2 * | 11/2011 | Kiya et al. | 180/68.5 |
| 8,074,757 B2 | 12/2011 | Wagner et al. | |
| 8,511,412 B2 * | 8/2013 | Kawaguchi et al. | 180/68.5 |
| 8,540,282 B2 * | 9/2013 | Yoda et al. | 280/784 |
| 2004/0079569 A1 * | 4/2004 | Awakawa | 180/68.5 |
| 2008/0196957 A1 * | 8/2008 | Koike et al. | 180/68.5 |
| 2009/0017367 A1 * | 1/2009 | Marubayashi | 429/99 |
| 2010/0289295 A1 * | 11/2010 | Yoda et al. | 296/187.03 |
| 2010/0314184 A1 * | 12/2010 | Stenberg et al. | 180/65.6 |
| 2011/0139527 A1 | 6/2011 | Bannier et al. | |
| 2011/0204013 A1 * | 8/2011 | Lahti et al. | 211/85.8 |
| 2011/0236718 A1 * | 9/2011 | Fukuda et al. | 428/654 |
| 2011/0266838 A1 * | 11/2011 | Leopold | 296/193.07 |
| 2012/0156537 A1 * | 6/2012 | Meintschel et al. | 429/99 |
| 2012/0175177 A1 * | 7/2012 | Lee et al. | 180/68.5 |
| 2013/0022845 A1 * | 1/2013 | Davis et al. | 429/72 |
| 2013/0130078 A1 * | 5/2013 | Schaefer et al. | 429/72 |

(Continued)

FOREIGN PATENT DOCUMENTS

| | | |
|---|---|---|
| JP | 6219336 | 8/1994 |
| WO | 2007112118 | 10/2007 |

(Continued)

*Primary Examiner* — Ula C Ruddock
*Assistant Examiner* — Anna Korovina
(74) *Attorney, Agent, or Firm* — Jason Rogers; Brooks Kushman P.C.

(57) ABSTRACT

A cage assembly is provided to protect a battery pack in a vehicle. The cage assembly includes a top sub-assembly and a bottom sub-assembly that are secured together to protect the battery pack. U-shaped frames and base frames are connected together by tubular members.

10 Claims, 3 Drawing Sheets

(56) References Cited

U.S. PATENT DOCUMENTS

2013/0230759 A1* 9/2013 Jeong et al. .................. 429/99
2013/0330579 A1* 12/2013 Ejiri et al. ..................... 429/53

FOREIGN PATENT DOCUMENTS

| WO | WO 2011082226 A2 | * | 7/2011 |
| WO | WO 2012/067365 | * | 7/2012 |

* cited by examiner

PROTECTIVE VEHICLE BATTERY CAGE AND METHOD OF MAKING A BATTERY CAGE

TECHNICAL FIELD

This disclosure relates to a cage for attaching a battery pack to a vehicle that protects the battery pack in the event of a collision and also facilitates servicing the battery pack.

BACKGROUND

Battery cells for Battery Electric Vehicles (BEV), Hybrid Electric Vehicles (HEV) and Partial Hybrid Electric Vehicles (PHEV) are packaged in locations that are spaced away from crash zones to minimized any risk of damage during a collision event.

The tunnel that runs longitudinally along the middle of the floor may be a suitable package space for the battery because it is spaced away from the extremities of the vehicle. Under floor packaging of a typical battery pack may include cells arranged longitudinally and transversely in the vehicle. The entire battery pack may be housed within the tunnels laid out longitudinally and transversely in the floor of the vehicle. The area under the tunnels is a relatively a safe zone for the battery cells and performs well in full frontal and rear barrier crash tests.

However, in side crashes Moving Deformable Barrier (MDB) and Side Pole crash tests the vehicle has a tendency to bend and wrap around the impacting barrier or pole causing the tunnel to collapse laterally. The floor wraps around the pole and forces the tunnel to collapse on itself since the body side and underbody do not provide sufficient resistance. As a result of the tunnel collapsing, battery cells can suffer damage in such a crash mode.

Strengthening the rocker, the cross members and underbody do not provide effective and weight efficient protection for the battery cells in the tunnel space. Up gauging of all underbody structural components including the tunnel, crossmembers, and adding tunnel reinforcements and bulk heads can mitigate tunnel collapse to some extent. However, resulting weight penalty generally out-weighs the benefits and does not provide an acceptable solution.

This disclosure is directed to solving the above problems and other problems relating to securing a battery pack in a BEV, HEV or PHEV type of vehicle.

SUMMARY

According to one aspect of this disclosure, a cage is provided for a battery pack. The cage comprises a top sub-assembly that includes a first plurality of tubes that are spaced apart and a plurality of spaced inverted U-shaped frames that have a frame height corresponding to the height of one or more batteries. The cage also comprises a lower sub-assembly including a second plurality of tubes that are spaced apart and a plurality of spaced frames having a height that is less than the frame height, and is assembled to the top sub-assembly.

According to other aspects of this disclosure relating to the cage for a battery pack, the inverted U-shaped frames may define a plurality of openings that each receive one of the first plurality of tubes. The spaced frames of the lower sub-assembly each may define a plurality of openings that each receive one of the second plurality of tubes. The spaced inverted U-shaped frames may have upper feet that extend outwardly from the lower ends of the U-shaped frames and the spaced frames of the lower sub-assembly may each have lower feet that extend outwardly from the spaced frames at locations corresponding to the upper feet to facilitate assembling the upper feet to the lower feet with fasteners. The lower sub-assembly may further comprise a pan that is framed by a portion of the tubes and the spaced frames of the lower sub-assembly.

According to additional aspects of this disclosure, the first plurality of tubes may include a first set of longitudinally extending tubes and a first set of transversely extending tubes. The second plurality of tubes may include a first set of longitudinally extending tubes and a second set of transversely extending tubes. The first set of longitudinally extending tubes and the second set of longitudinally extending tubes may be assembled to a longitudinally extending tunnel in a floor pan of a vehicle and the first set of transversely extending tubes and the second set of transversely extending tubes may be assembled to a transversely extending tunnel formed in the floor pan of the vehicle.

The cage for a battery pack of a vehicle is provided in combination with the battery pack and further comprises a plurality of battery cells. The top sub-assembly and lower sub-assembly are assembled together on opposite sides of the battery cells. The combination may further comprise a damper that comprises a foam pad disposed between the battery cells and the top sub-assembly and/or lower sub-assembly.

According to other aspects of this disclosure as it relates to a method of making a cage for a battery pack of a vehicle, the method may comprise assembling a first plurality of spaced tubes that and a plurality of spaced inverted U-shaped frames to from a first sub-assembly, and assembling a second plurality of spaced tubes and a plurality of spaced frames to form a second sub-assembly. The first sub-assembly and the second sub-assembly are assembled together to enclose the battery pack.

According to other aspects of the method, the first plurality of spaced tubes may be welded to the plurality of spaced inverted U-shaped frames and the second plurality of spaced tubes may be welded to the plurality of spaced frames. The first and second plurality of spaced tubes may be extruded. The U-shaped frames and spaced frames may be extruded. Alternatively, the U-shaped frames and the spaced frames may be formed by casting. The method of making a cage for a battery pack claim may further comprise bolting the first sub-assembly to the second sub-assembly.

The method of making a cage for a battery pack may further comprise inserting a damper between the battery pack and the second sub-assembly The above aspects of the disclosure and other aspects will be more fully described below in the detailed description of the illustrated embodiments and in view of the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
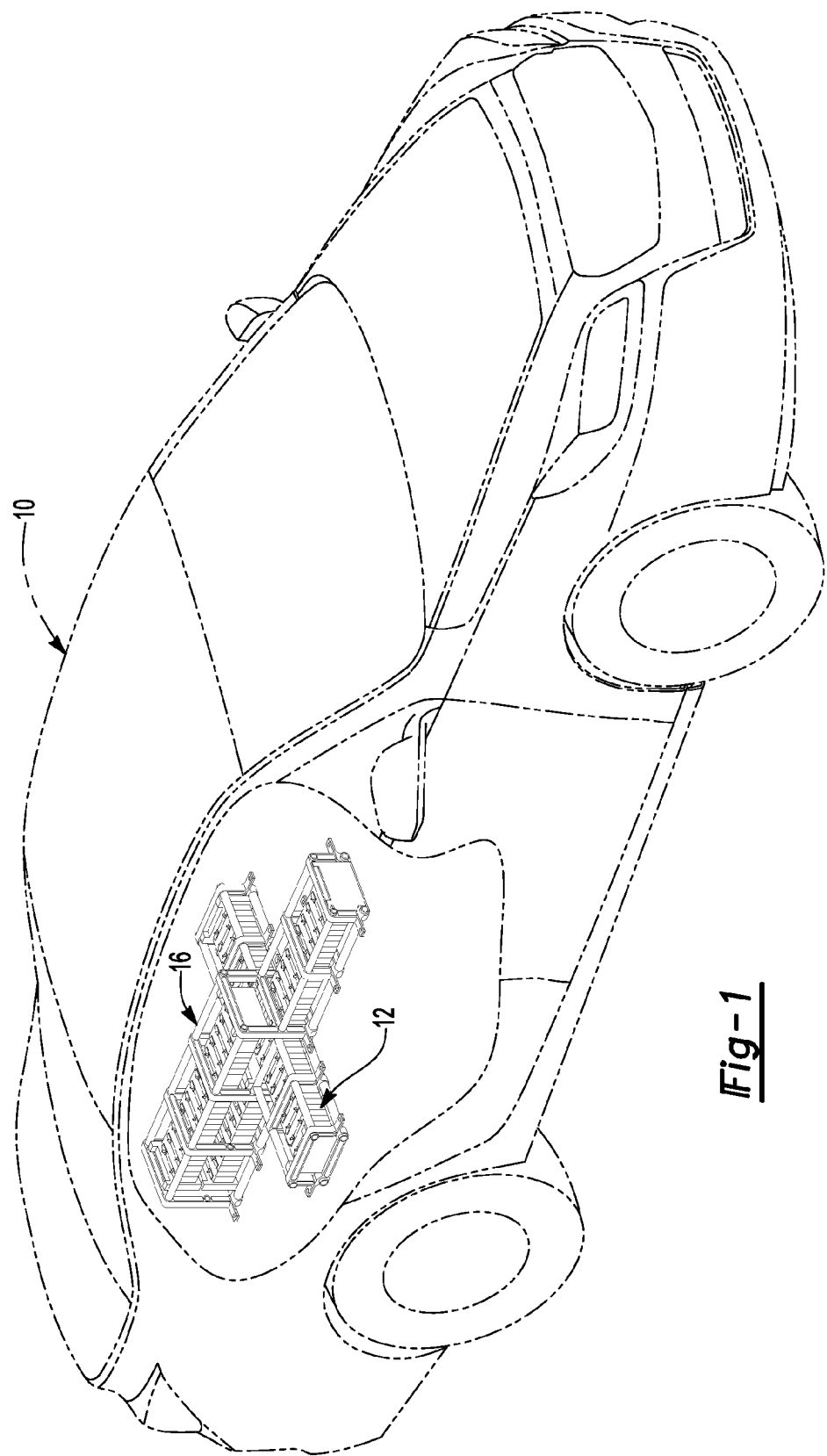
FIG. 1 is a fragmentary perspective view of a battery cage enclosing a plurality of battery cells in a vehicle that is shown in phantom.

Referring to FIG. 1, a vehicle 10 is shown with a battery pack 12. The battery pack 12 is partially enclosed by a cage assembly 16. The cage assembly 16 is provided to protect the battery pack 12 in the event that the vehicle 10 is involved in a collision. The cage assembly 16 prevents impact loads from being transferred directly to the battery pack 12. The cage assembly 16 protects the battery pack 12 from deformation due to crash loading.

Figure 2:
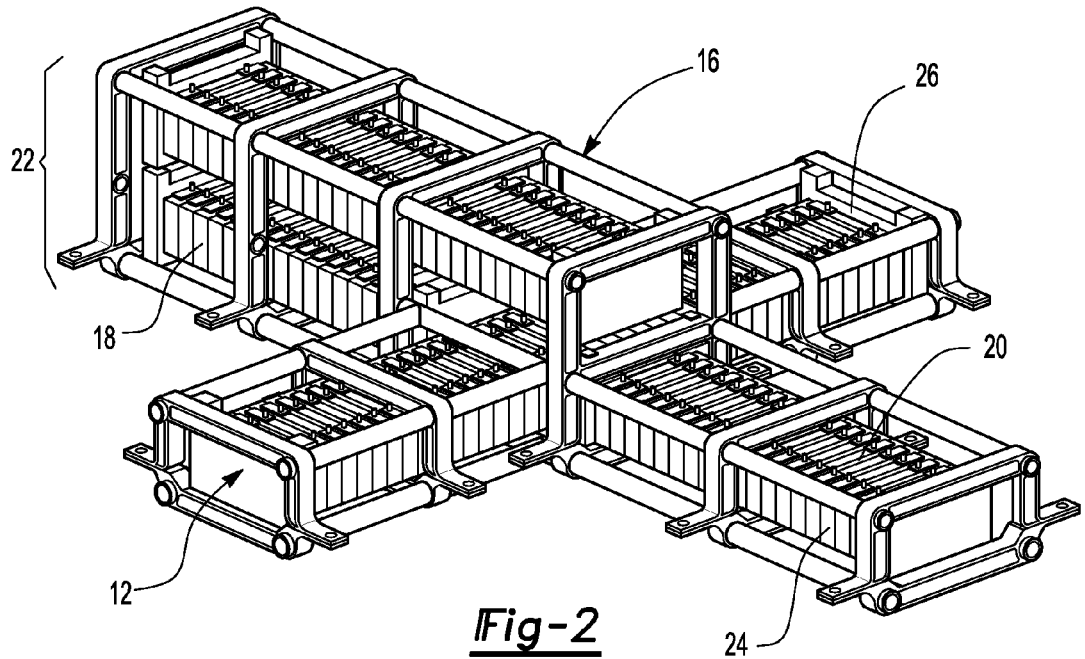
FIG. 2 is a perspective view of a cage and a battery pack.

Referring to FIG. 2, the battery pack 12 is shown in greater detail as it is disposed within the cage assembly 16. The battery pack 12 is made up of a plurality of individual battery cells 18. The battery cells 18 may be arranged in a longitudinal stack 20 that extends in a longitudinal vehicle direction. The longitudinal stack 20, as shown, includes a portion that has a double stack 22 of battery cells 18 and a single stack 24 of batteries 18. A transverse stack 26 of battery cells 18 is also shown in FIG. 2 that extends in the transverse vehicle direction. The transverse stack 26 intersects the longitudinal stack 20. It should be understood that the battery pack 12 and cage assembly 16 may be arranged with a different number of battery cells 18 or in a different arrangement depending upon the packaging space available within a given vehicle design.

Figure 3:
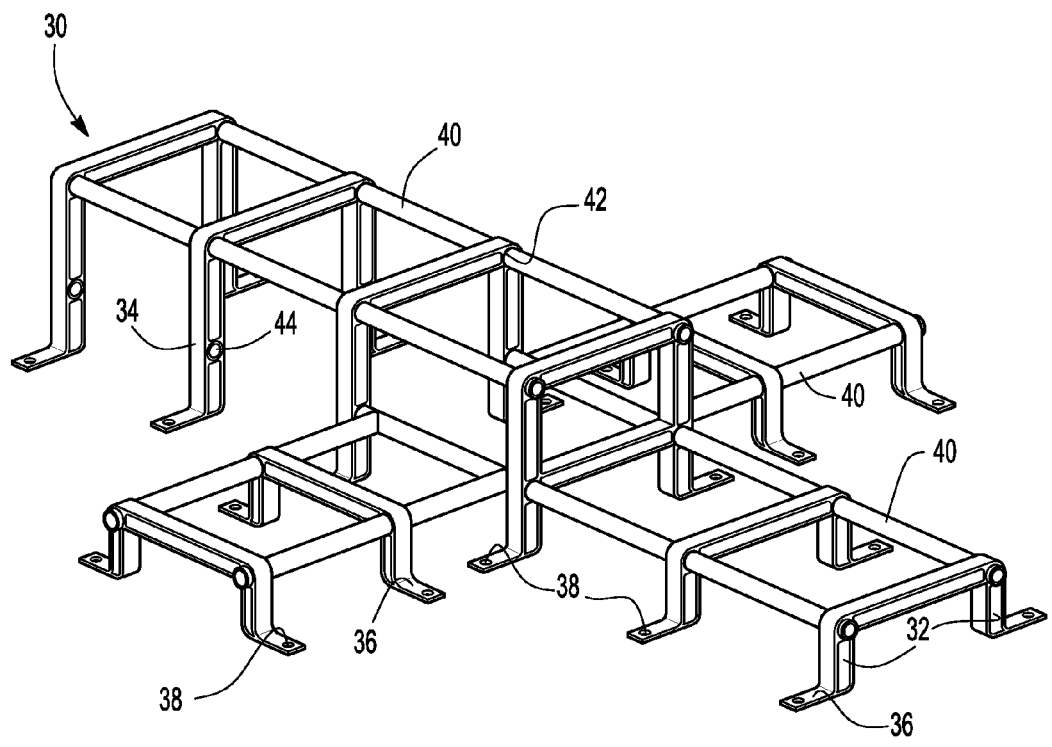
FIG. 3 is a perspective view of a top sub-assembly of the cage for a battery pack.

Referring to FIG. 3, a top sub-assembly 30 of the cage assembly 16 is illustrated. The top sub-assembly 30 includes a plurality of U-shaped frames 32 in the single stack 24 area of the cage assembly 16. A plurality of double stacked U-shaped frames 34 are also provided as part of the longitudinal stack 20 that includes the double stack 22 of battery cells 18. The U-shaped frames 32, 34 each include a pair of upper feet 36 on the lower ends of the U-shaped frames. The cage assembly 16 may be formed using U-shaped frames 32, 34 that are formed as aluminum extrusion or magnesium castings. Alternatively, carbon fiber reinforced plastics may be used to further reduce the weight of the U-shaped frames 32 and 34.

Holes 38 are provided in the upper feet 36 to receive fasteners (not shown). Tubes 40 are inserted into top holes 42 that are provided in the U-shaped frames 32 and the double stacked U-shaped frames 34. Intermediate holes 44 are provided at an intermediate location on the double stacked U-shaped frames 34.

Figure 4:
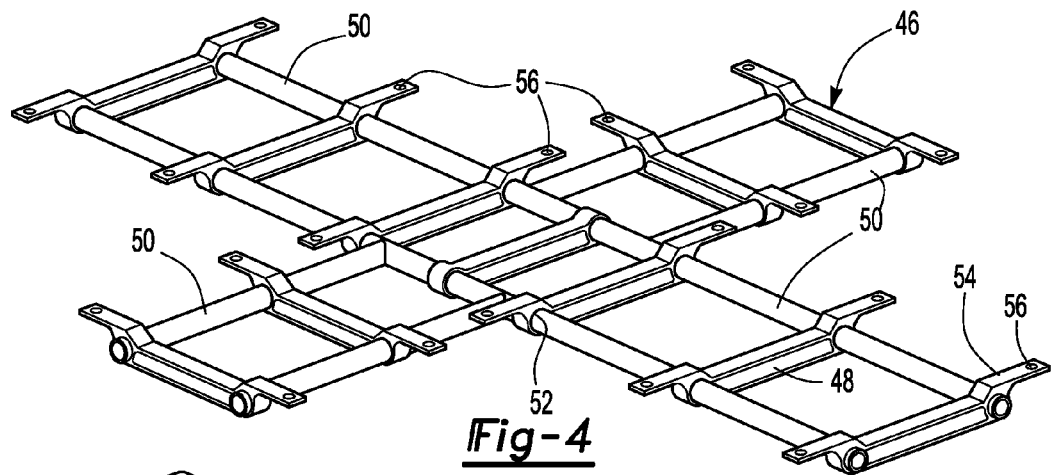
FIG. 4 is a perspective view of a lower sub-assembly of a cage for a battery pack.

Referring to FIG. 4, a bottom sub-assembly 46 is illustrated that includes a plurality of base frames 48 that are interconnected by tubular segments 50. The tubes 40, 50 may be formed as extruded tubes or as seamless aluminum tubing. The tubular segments 50 may stem between two base frames 48 or through six or more base frames 48, as shown in FIG. 4. Holes 52 that receive the tubular segments 50 are provided in each of the base frames 48. The tubes 40, 50 are preferably welded into the holes 38, 52 by MIG welding or other joining techniques. A pair of lower feet 54 are provided on each of the base frames 48. A hole 56 for a fastener (not shown) is provided in each of the lower feet 54.

Figure 5:
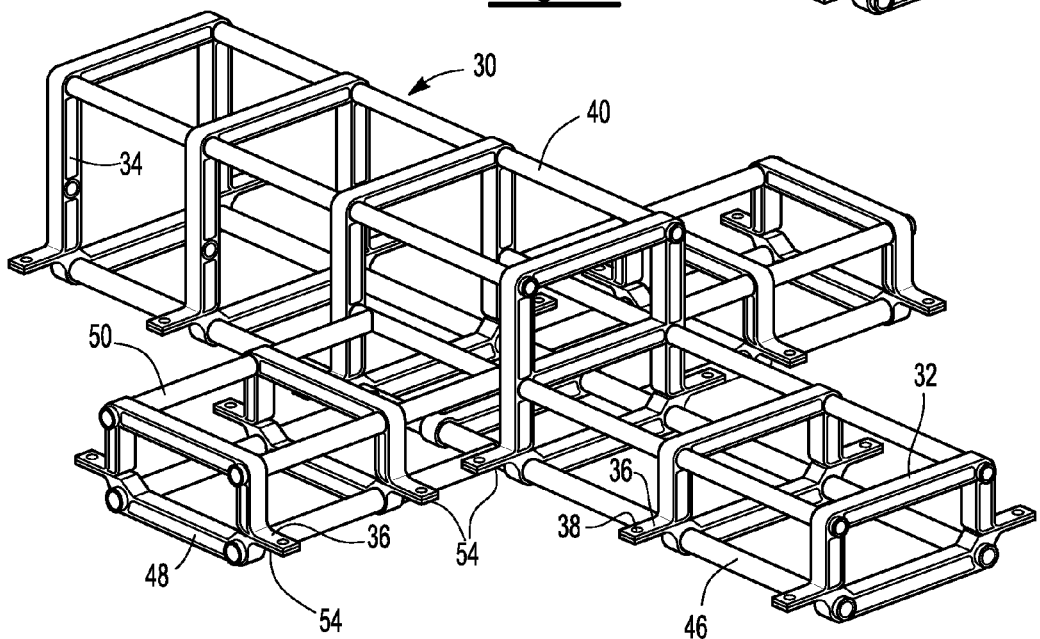
FIG. 5 is a perspective view of the assembled cage for a battery pack.

Referring to FIG. 5, the cage assembly 16 is shown with the top sub-assembly 10 shown in FIG. 3 being assembled to the bottom of the sub-assembly 46 shown in FIG. 4. The upper feet 36 are attached to the lower feet 54 by fasteners that are inserted through the hole 38 in the upper feet 36 and the holes 56 provided in the lower feet 54. The lower sub-assembly 46 can be constructed with a framed pan that holds the battery pack and allow the entire battery pack to be removed for servicing.

Figure 6:
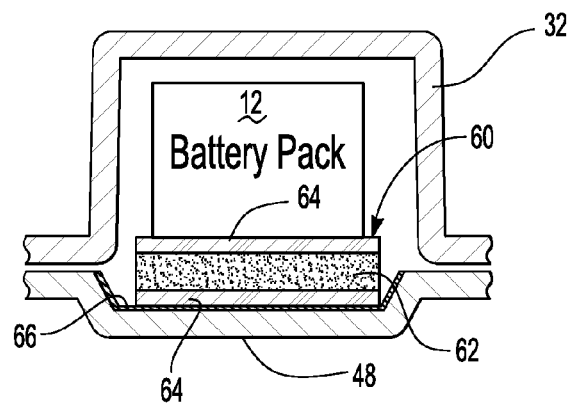
FIG. 6 is a diagrammatic cross-sectional view of a battery pack disposed on a isolator.

Referring to FIG. 6, a damper 60 is shown diagrammatically, the battery pack 12 is supported on the damper 60. The damper 60 includes a foam layer 62 that is flanked on upper and lower sides by rigid layer 64. The damper 60 may be supported on a bottom pan 66 that is disposed between the damper 60 and the base frames 48. The U-shaped frame 32 is shown assembled to the base frame 48 to enclose the battery pack 12. The damper 60 prevents impact loads from being transferred directly to the battery pack. The cage assembly 16 prevents adverse deformation of the battery pack due to crash loading. The battery pack 12 can be isolated by the damper 60 to mitigate the effects of any harmful sudden acceleration or deceleration of the battery pack when the vehicle is impacted.

A bottom sub-assembly 46 may be removed from the top sub-assembly 30 in the event that it is necessary to service the battery cells 48. The top sub-assembly 30 may be secured to the vehicle 10 on the bottom sub-assembly 46 is secured under the top sub-assembly 30. The fasteners securing the bottom sub-assembly 46 to the top sub-assembly 30 may be removed and the bottom sub-assembly 46 may be removed to either provide access to the battery cells 18 or to allow the battery pack 12 to be removed from the vehicle 10 while either leaving the top sub-assembly 30 attached to the vehicle 10 or the top sub-assembly may be removed with the bottom sub-assembly 46 with the battery pack 12

The cage assembly 16 is a lightweight space frame structure that is intended to protect a battery electric vehicle, hybrid electric vehicle, or partial hybrid electric vehicle battery cells in vehicle crashes.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A cage for battery cells comprising:
   a top sub-assembly including first longitudinal and transverse spaced apart tubes directly connected to one another and spaced inverted U-shaped frames having a frame height corresponding to an electrified vehicle battery height; and
   a lower sub-assembly including spaced frames connected to the U-shaped frames having a height less than the frame height and second longitudinal and transverse spaced apart tubes directly connected to one another.

2. The cage for the battery cells of claim 1 wherein the spaced inverted U-shaped frames define a plurality of openings that each receive one of the first longitudinal and transverse spaced tubes.

3. The cage for the battery cells of claim 1 wherein the spaced frames of the lower sub-assembly each define a plurality of openings that each receive one of the second longitudinal and transverse spaced apart tubes.

4. The cage for the battery cells of claim 1 wherein the spaced inverted U-shaped frames have a pair of upper feet that extend outwardly from a pair of lower ends of the spaced inverted U-shaped frames, and wherein the spaced frames of the lower sub-assembly each have lower feet that extend outwardly from the spaced frames at locations corresponding to the upper feet, and wherein the upper feet are assembled to the lower feet with fasteners.

5. The cage for the battery cells of claim 1 wherein the lower sub-assembly further comprises a pan that is framed by a portion of the second longitudinal and transverse spaced apart tubes.

6. The cage for the battery cells of claim 1 wherein the spaced inverted U-shaped frames of the top sub-assembly and the spaced frames of the lower sub-assembly are castings.

7. The cage for the battery cells of claim 1 wherein the spaced inverted U-shaped frames of the top sub-assembly and the spaced frames of the lower sub-assembly are extruded parts.

8. The cage for the battery cells of claim 1, wherein the top sub-assembly and lower sub-assembly are assembled together on opposite sides of the battery cells.

9. The cage for the battery cells of claim 8 further comprising a damper disposed between the battery cells and the lower sub-assembly, wherein the damper includes a resilient foam pad.

10. The cage for the battery cells of claim 1, wherein the first longitudinal and transverse spaced apart tubes are arranged with one another to receive, without contacting, endplates and the battery cells.

\* \* \* \* \*